N. OLIVIER.
PARALLEL VISE.
APPLICATION FILED SEPT. 13, 1920.

1,383,658.

Patented July 5, 1921.
2 SHEETS—SHEET 1.

Witnesses
Jean Germain
Guillaume Pioche

Inventor
Nicolas Olivier
By B. Singer, Atty.

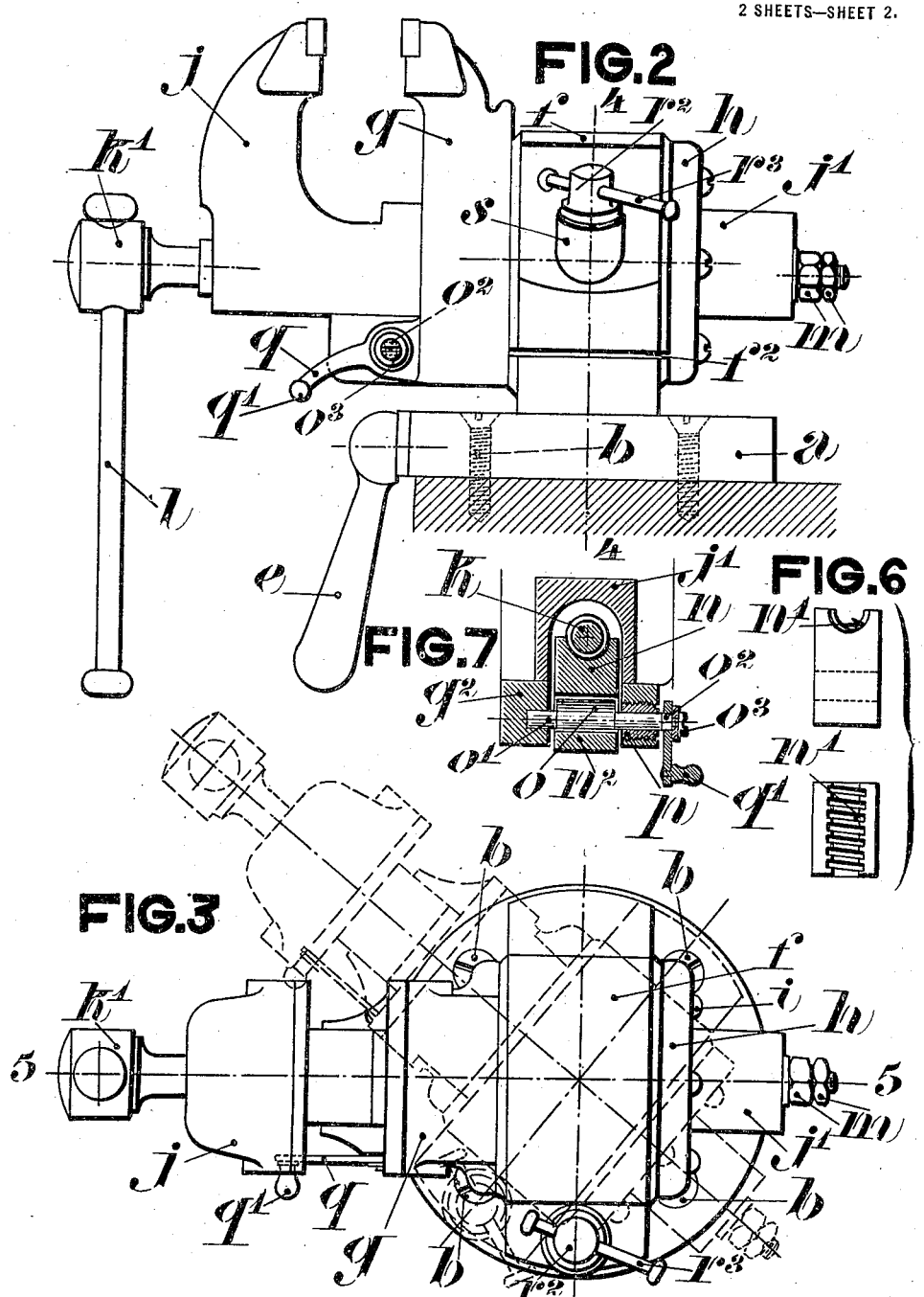
N. OLIVIER.
PARALLEL VISE.
APPLICATION FILED SEPT. 13, 1920.
1,383,658.
Patented July 5, 1921.
2 SHEETS—SHEET 2.

UNITED STATES PATENT OFFICE.

NICOLAS OLIVIER, OF LYON, FRANCE.

PARALLEL VISE.

1,383,658.  Specification of Letters Patent.  Patented July 5, 1921.

Application filed September 13, 1920. Serial No. 409,785.

*To all whom it may concern:*

Be it known that I, NICOLAS OLIVIER, a citizen of the French Republic, and a resident of Lyon, France, have invented certain new and useful Improvements in Parallel Vises, of which the following is a specification.

The present invention relates to a parallel vise which can be rapidly moved and held in any desired position according to the nature of the work to be effected.

The accompanying drawings show by way of example one form of vise constructed in accordance with this invention.

Fig. 2 is a side view.

Fig. 3 is a plan.

Fig. 6 shows in detail a front elevation and plan respectively of the engaging nut of the movable jaw of the vise.

Fig. 7 is a detail view of the cam for bringing the nut into engagement with the actuating screw.

A plate $a$ is affixed by screws or bolts $b$ on a bench $c$ or on to the table of a machine tool. The plate $a$ is provided with an oval aperture the sides $a^1$ of which are inclined and with a diametrical groove $a^2$ in which a long key $d$ can move. The key $d$ is recessed at $d^1$ and terminates in a screwed portion $d^2$ to receive the screwed head $e^1$ of an actuating lever $e$.

A truncated conical projection $f^1$ of a support $f$ projects into the central aperture of the plate $a$ and rests on the recessed portion $d^1$ of the key $d$. The support $f$ is bored out to form a universal bearing for the trunnion $g^1$ of one of the jaws $g$ of the vise, which is prevented from leaving its bearing by a ring $h$ affixed to its end by screws $i$.

The trunnion $g^1$ is hollow to receive a sliding member $j^1$ forming part of the jaw $j$ of the vise. The sliding member $j^1$ is preferably hollow to receive a screw $k$ passing longitudinally therethrough.

The screw $k$ is carried by the bearings $j^2$, $j^3$ and is formed at one end with a head $k^1$ through which passes the level $l$ by which it is operated. Two nuts $m$ hold the screw $k$ in position in the bearings $j^2$, $j^3$ in which it can freely rotate.

The jaw $g$ is provided on its under side with a projection $g^2$ having a large aperture in which a block $n$ is mounted so as to be capable of moving freely therein. The upper part of the block $n$ is formed with a screw thread to form a nut $n^1$ for the screw $k$ (Fig. 6). The block $n$ is also formed with an opening $n^2$ to receive a cam $o$ one of the trunnions $o^1$ of which is situated in a recess formed in the projection $g^2$ and the other trunnion $o^2$ rotates in a sleeve screwed into an aperture on the other face of the said projection. The end of the trunnion $o^2$ is rectangular and the operating lever $q$ which is provided with a handle $q^1$ is affixed thereto by a screw.

The support $f$ is formed in its lower part with a slit $f^2$ and a hole passes through the two parts, the hole in the part below the slit $f^2$ being screwed to receive a rod $r$ screwed at its end $r^1$. The upper end of the rod $r$ is formed with a head $r^2$ which engages a boss $s$ on the support $f$. A pin $r^3$ is provided for operating the rod $r$.

Figure 5:
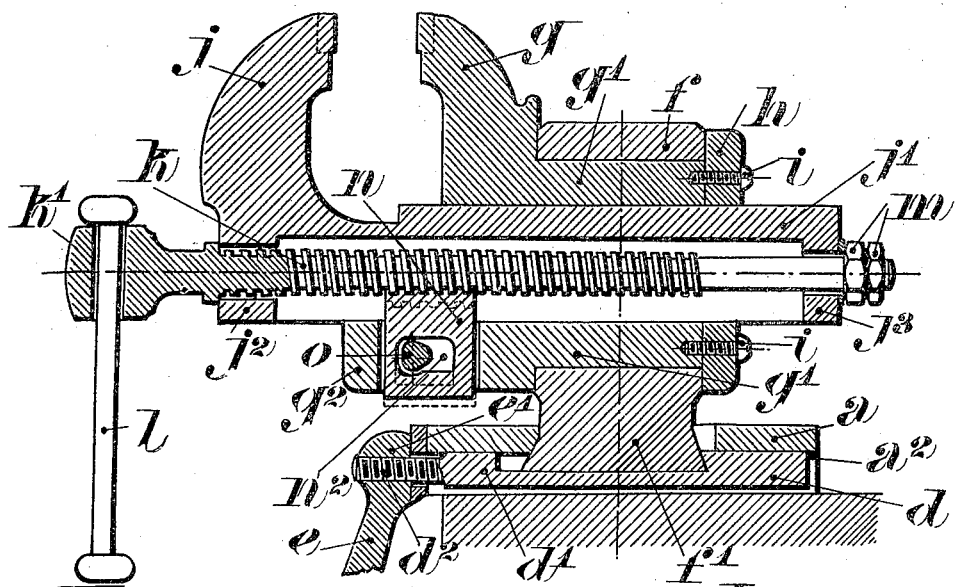
Fig. 5 is a longitudinal section on line 5—5.

The working of the vise is as follows:

To open and close the vise quickly the lever $q$ is moved to the position at which the cam $o$ causes the block $n$ to move downward (position shown in dotted lines in Fig. 5). The nut $n^1$ is then disengaged from the screw $k$ and the jaw $j$ with its slide member $j^1$ can then be moved backward and forward as desired without operating the screw $k$.

To open and close the vise by means of the screw $k$ the lever $q$ is turned into the position at which the cam $o$ moves the block $n$ into engagement with the screw $k$ (position shown in full lines in Fig. 5) and the vise then operates as an ordinary parallel vise.

To vary the rotary position of the vise the lever $e$ is turned into the position to release the key $d$. The truncated conical portion $f^1$ of the support $f$ can then be rotated in its support and the whole of the vise turned about the plate $a$ into the position, for example shown in dotted lines in Fig. 3. The vise is again locked into the desired position by turning the lever $e$ in the reverse direction and as the head $e^1$ forms a nut for the screwed end $d^2$ of the key $d$ the latter is displaced to lock the truncated conical portion $f^1$ of the support $f$ against the plate $a$.

Figure 1:
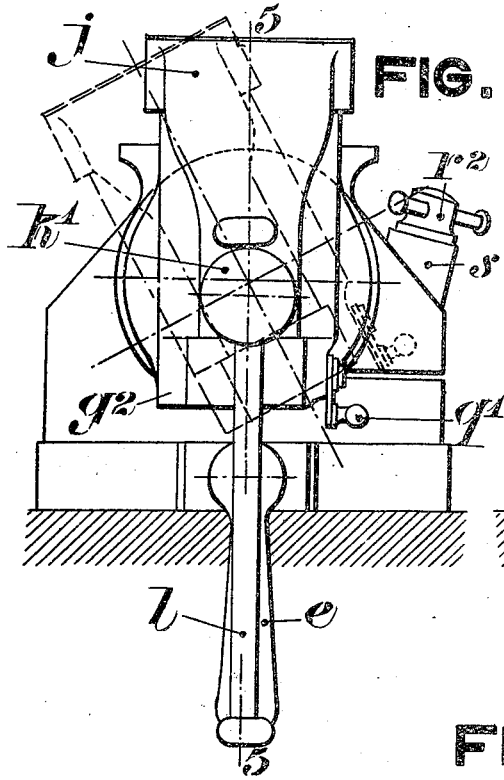
Figure 1 is a front elevation.
Figure 4:
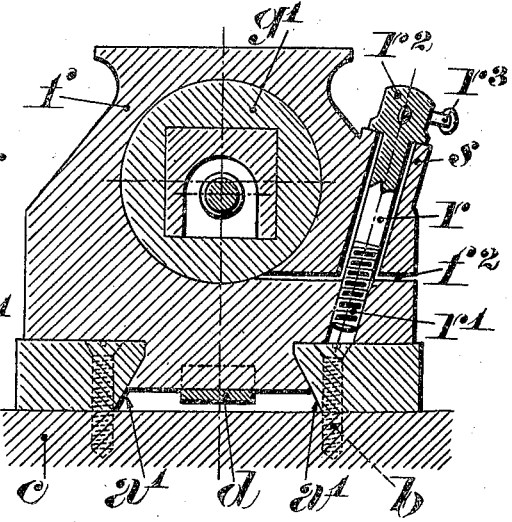
Fig. 4 is a transverse section on line 4—4.

Finally the jaws can be pivoted about the screw $k$ taken as its axis. To effect this the rod $r$ is rotated so that its screwed end $r^1$ produces a slight loosening of the two parts of the support $f$ separated by the slit $f^2$. The trunnion $g^1$ can then rotate in the bearing formed by the support $f$ to the position for example shown in dotted lines in Fig. 1. It is locked in the desired position by the rotation of the rod $r$ in the opposite direction which causes the tightening together of the two parts of the support $f$ separated by the slit $f^2$.

The movable sliding member $j$ may be of circular or rectangular section. Furthermore the arrangements which have been described are not only applicable to a bench vise but to vises of all types employed for holding articles on machine tools.

What I claim as my invention is:—

A quick action parallel vise capable of being rotated in the plane of its support and in a plane perpendicular thereto comprising a plate formed at its center with an aperture the edges of which are inclined, a support with a truncated conical base engaging in the said aperture, a sliding key on which said base rests, said key serving to lock the said base to the support and means for moving the key for locking and releasing the support to permit of the rotation thereof substantially as described.

In witness whereof I affix my signature.

NICOLAS OLIVIER.

Witnesses:
 JEAN GERMAIN,
 JULIAN KEMBLE SMEDBERG.